United States Patent
Yu (10) Patent No.: US 7,080,079 B2
(45) Date of Patent: Jul. 18, 2006

(54) METHOD OF USING THE INTERNET TO RETRIEVE AND HANDLE ARTICLES IN ELECTRONIC FORM FROM PRINTED PUBLICATION WHICH HAVE BEEN PRINTED IN PAPER FORM FOR CIRCULATION BY THE PUBLISHER

(76) Inventor: Philip K. Yu, 20955 Pathfinder Rd., Ste. 160, Diamond Bar, CA (US) 91765

( * ) Notice: Subject to any disclaimer, the term of this patent is extended or adjusted under 35 U.S.C. 154(b) by 321 days.

(21) Appl. No.: 09/995,931

(22) Filed: Nov. 28, 2001

(65) Prior Publication Data

US 2002/0065808 A1    May 30, 2002

Related U.S. Application Data

(60) Provisional application No. 60/253,490, filed on Nov. 28, 2000.

(51) Int. Cl.
*G06F 17/30*     (2006.01)
*G06F 17/00*     (2006.01)
*G06F 15/16*     (2006.01)

(52) U.S. Cl. .................... 707/10; 707/1; 707/104.1
(58) Field of Classification Search .......... 707/1–10, 707/100–104.1; 715/500.1, 510–515, 522, 715/523, 501.1; 704/9; 705/25–28, 36, 705/50–51, 1–4, 14, 10; 709/203, 219, 220; 713/200
See application file for complete search history.

(56) References Cited

U.S. PATENT DOCUMENTS 5,530,520 A * 6/1996 Clearwater ................ 399/366
5,850,520 A * 12/1998 Griebenow et al. ......... 709/206
5,995,976 A * 11/1999 Walker et al. ........... 707/104.1
6,014,641 A * 1/2000 Loeb et al. .................. 705/34
6,134,552 A * 10/2000 Fritz et al. .................. 707/10
6,148,331 A * 11/2000 Parry ......................... 709/218

(Continued)

FOREIGN PATENT DOCUMENTS

CA        2193734        *    6/1998

(Continued)

OTHER PUBLICATIONS

U.S. Appl. No. 60/201,340.*

(Continued)

*Primary Examiner*—Srirama Channavajjala
(74) *Attorney, Agent, or Firm*—East IP Group; Philip K. Yu (57) ABSTRACT

A method and system of using the Internet to retrieve printed articles from printed media. The method of the present invention first tags each printed article that is to be published in print. The tag is also printed with the printed article to allow readers to identify. The printed article and its tag are collected and stored in a database, which is accessible through the Internet or the Worldwide Web. When a reader finds a printed article of interest to the reader on the print version of the media, the reader sends a request with the tag to the database. Upon receiving the request and the tag, the database is searched to locate the printed article. Upon locating the stored printed article in the database, it is transmitted to the reader's computer or to the reader's email address. Such article can now be stored, filed, distributed, shared in anyway the reader sees fit, all without having to labor through the traditional manual clipping tasks. Additionally, each retrieval of the printed article is bundled with additional information that is relevant to the printed article.

8 Claims, 4 Drawing Sheets

U.S. PATENT DOCUMENTS

| | | | |
|---|---|---|---|
| 6,253,188 B1* | 6/2001 | Witek et al. | 705/14 |
| 6,292,796 B1* | 9/2001 | Drucker et al. | 707/5 |
| 6,304,849 B1* | 10/2001 | Uecker et al. | 705/3 |
| 6,332,124 B1* | 12/2001 | Loeb et al. | 705/1 |
| 6,389,541 B1* | 5/2002 | Patterson | 713/201 |
| 6,449,616 B1* | 9/2002 | Walker et al. | 707/10 |
| 6,460,036 B1* | 10/2002 | Herz | 707/10 |
| 6,546,406 B1* | 4/2003 | DeRose et al. | 715/513 |
| 6,549,956 B1* | 4/2003 | Bass et al. | 719/328 |
| 6,589,292 B1* | 7/2003 | Langford-Wilson | 715/517 |
| 6,704,739 B1* | 3/2004 | Craft et al. | 707/102 |
| 6,816,907 B1* | 11/2004 | Mei et al. | 709/229 |
| 6,941,474 B1* | 9/2005 | Boies et al. | 709/225 |
| 6,970,931 B1* | 11/2005 | Bellamy et al. | 709/227 |
| 2001/0039515 A1* | 11/2001 | Mayadas | 705/14 |
| 2001/0047362 A1* | 11/2001 | Comroe | 707/104.1 |
| 2002/0049781 A1* | 4/2002 | Bengtson | 707/500.1 |
| 2002/0156678 A1* | 10/2002 | Adams | 705/14 |
| 2002/0165882 A1* | 11/2002 | Zettel et al. | 707/530 |
| 2002/0184183 A1* | 12/2002 | Cherry et al. | 707/1 |
| 2002/0194011 A1* | 12/2002 | Boies et al. | 705/1 |
| 2003/0046311 A1* | 3/2003 | Baidya et al. | 707/200 |
| 2003/0140061 A1* | 7/2003 | Singer | 707/104.1 |
| 2004/0034640 A1* | 2/2004 | Jain et al. | 707/10 |
| 2004/0180621 A1* | 9/2004 | Fowler | 455/39 |

FOREIGN PATENT DOCUMENTS

| | | | |
|---|---|---|---|
| CA | 2326010 | * | 5/2002 |
| EP | 0775962 | * | 5/1997 |
| EP | 0936567 | * | 8/1999 |
| EP | 1158424 | * | 11/2001 |
| EP | 1160693 | * | 12/2001 |
| EP | 1324212 A2 * | | 7/2003 |
| GB | 2328300 | * | 2/1999 |
| GB | 2368423 | * | 5/2002 |
| GB | 2403568 | * | 1/2005 |
| WO | WO 97/27553 | * | 7/1997 |
| WO | WO 98/08344 | * | 2/1998 |
| WO | WO 99/17496 | * | 4/1999 |
| WO | WO 00/08541 | * | 2/2000 |
| WO | WO 00/45321 | * | 8/2000 |
| WO | WO 00/48098 | * | 8/2000 |
| WO | WO 00/57321 | * | 9/2000 |
| WO | WO 00/70436 | * | 11/2000 |
| WO | WO 00/79406 A1 * | | 12/2000 |
| WO | WO 01/37119 A2 * | | 5/2001 |
| WO | WO 02/03254 A1 * | | 1/2002 |
| WO | WO 02/052454 A1 * | | 7/2002 |
| WO | WO 2005008539 A1 * | | 1/2005 |

OTHER PUBLICATIONS

U.S. Appl. No. 60/201,570.*

Isabella Hofstetter, "Multimedia applications for local newspapers and local information",computer networks and ISDN systems 30 (1998), pp. 1223-1232.*

LC Amundsen et al. "IBM technical disclosure bulletin", "multi-environment preprocessor for documentation publishing system", IBM corp, 1994, vol. 37, No. 048, Apr. 1994, , pp. 85-87.*

Zeng,L et al. "a semantic publish/subscribe system", proceddings of the IEEE international conference on E-commerce technology for dynamic e-business, 2004, pp. 32-39.*

San San Sy, ACJ Net: electronic publishing, Legal studies program, University of Alberta, Mar. 199815 pages.*

"give online news stores a relative importance rank", Jan. 5, 20049 pages.*

Rahul Mahaja, "multi-user login with databased authentication"2006, 3 pages.*

Robert E Filman, "Not free, but relatively inexpensive", IEEE internet compouting, IEEE computer society, 2004, 3 pages.*

Ingar Maehlum Arntzen et al. "a stateful and open publish subscribe for online marketplaces", proceedings of the 25th IEEE international conference on distributed computing systems, workshops, 2005, 7 pages.*

Carlo Blundo et al. "a software infrastructure for authenticated web metering", IEEE computer society, 2004, pp. 28-33.*

Jack G Conrad et al. "early usr-system interaction for database selection in massive domain-specific online environments", ACM transactions on information systems, vol. 21, No. 1, Jan. 2003, pp. 94-131.*

Ali Farhoomand et al. "SCMP.com: strategic repositioning of a newspaper", proceedings of the twenty first international conference on information systems, 2000, pp. 743-767.*

"BUSINESS 2.0", Nov. 28, 2000, p. 26, published by Imagine Media, Inc., Brisbane, CA 94005.

"Save This" home page, www.savethis.clickability.com, as of Jun. 28, 2004.

* cited by examiner

METHOD OF USING THE INTERNET TO RETRIEVE AND HANDLE ARTICLES IN ELECTRONIC FORM FROM PRINTED PUBLICATION WHICH HAVE BEEN PRINTED IN PAPER FORM FOR CIRCULATION BY THE PUBLISHER

RELATED APPLICATION

The present application claims priority from provisional application, Application No. 60/253,490, entitled "METHOD AND SYSTEMS FOR SUPPLYING INFORMATION FROM PRINTED MEDIA ON-DEMAND THROUGH THE INTERNET," filed on Nov. 28, 2000, by Applicant hereof.

FIELD OF THE INVENTION

The present invention relates to accessing and handling information through a global communication network ("the Internet") and more specifically to a method and system of accessing, handling, distributing printed information by using the Internet.

BACKGROUND OF THE INVENTION

Despite progresses made in the digital technology for printed publication, there is still a major gap, or disconnect, between the world of printed information and the world of the Internet. Publishers such as the Log Angeles Times and Business Week magazine have been circulating their print versions for a long time. However, they still fail to address one basic need of the general public who still read and depend on printed media for information.

Publishers have set up their own web sites as an on-line version, and more, of their printed version. However, it is not that convenient for those who try to retrieve a specific printed article from the web site, or the Internet in general. When a reader first finds an interesting article on a printed newspaper that she would like to file away or share with a colleague, the reader almost always has to endure the following manual steps: first, clipping the article from the newspaper, trimming the clip to fit on a standardized paper for photocopying, mailing or faxing. This process is relatively easy when the article occupies only a space which is smaller than the size of a standard paper, e.g. 8.5 inch by 11 inch. The process can become more tedious, when the article is printed across several pages, with different dimensions on each page. As can be appreciated by anyone who has tried to clip a multi-page article from a newspaper such as the Wall Street Journal, the efficient space management achieved by the publishing staff made a terrible and inefficient task for the readers who want to clip, save, file, photocopy or fax the article.

Even if the article is successfully clipped and filed away by the reader, it is then incumbent upon the reader's own filing systems to ensure that she can locate the clipped article later from her files when she needs it. For those who receive the clipped article faxed or mailed from this reader, their own filing systems also become a key if they wish to locate the same article from their own files later. In other words, the whole process is a terrible waste of time with no guarantee of precise retrieval. In a world where progress is made by the sharing of information, the printed newspaper and magazine have little value, other than conveying the printed information to the reader during reading. They are no way near being conduits for saving, sharing and distributing information.

Compared to clipping the article from a newspaper and photocopying it, getting the article from a magazine is relatively simpler, since most magazines are of a standard size. Even so, if a reader wishes to file, share, or fax an multi-page article from a magazine, the reader must still flip through all the pages to make a photocopy of the article. Again, the practice of placing advertisements on each pages, which is considered revenue-generating for the publishers, makes it quite inefficient for readers who want to save the article or share with others. An article may be only 1 page long, but with the insertion of advertisements, the article now spans across 5 pages. Worse yet, many technical periodicals, e.g. InfoWorld or EE Times, do not come in standard sizes. Clipping the articles for filing, copying and forwarding in those magazines thus becomes irritatingly time-consuming and inefficient. Further, even the article is adequately clipped and distributed, the same problem of storing, filing, distributing the clip reoccurs.

Faxing the clipped article creates another undesirable feature, since sequential faxing of the same article makes sequentially poorer quality of fax copies. And that is after going through the trouble of clipping, trimming, pasting, and photocopying etc.

The aforementioned problems apply to those who still like to read the printed newspaper or magazine, which is still the majority of the general public. Those using the Internet as their only source of information tend not have the same problem, since they get whatever that is presented on the web. When an Internet client browses the LA Times web site and finds an article he wishes to file for future reference, or to share with a colleague or a friend, he can take advantage of some utilities provided by the web site. For example, most are familiar with the tool such as "TO E-MAIL THIS ARTICLE TO A FRIEND," where with a few mouse clicks, the digital article is on its way to any recipient the Internet client desires, including the client itself. The Internet client can also use a print utility to print the article for his own reading or filing. Without question, such digital information can readily be saved, filed, forwarded, shared and distributed through the Internet. The teaming of PCs and the Internet makes it easy to store, share and file information in the digital format. However, nothing has been done for those who rely on the traditional printed media for information.

The disconnect between the digital world and the conventional print world makes filing, sharing and distributing printed information quite burdensome. While everything in the digital and Internet world is replicable and distributable, the way to make use of the printed articles in newspapers and magazines is still no different from the early days.

Therefore, the conventional way of clipping, photocopying, filing, or sharing a printed article from a newspaper or a magazine is inefficient. The conventional way also fails to guarantee easy and accurate retrieval.

The disadvantage and irritations in accessing and handling conventional printed information can be found in every aspect of the process: clipping, retrieving, storing/saving, filing, or faxing. Each step takes time and efforts, not to mention the demand on paper, on photocopying cost, on faxing cost and on storage space.

Even with the advent of the Internet and web servers, such needs are not entirely addressed. When a reader of the printed article goes to the web site to try to locate the article, he is often forced to start from the very top-level home page of the publisher. He will then have to find his way to the intended article, section by section or layer by layer, even when he knows exactly which article he is looking for. The problem lies in treating file retrieval the same as a search, when in fact all the user wants is to reach the desired article by pressing a few buttons.

Publishers of newspapers and magazines tend to use their web sites to draw traffic, by making Internet clients spend more time at the site. While many sites also offer a search utility, the results are often an overkill for the reader who is only looking for a specific article he has just read in the printed version. In other words, the web servers currently supported by the publishers do not facilitate easy and quick targeted search by the readers of the printed version.

Some tools have recently been developed in the publication world. In the Nov. 28, 2000 issue of the BUSINESS 2.0 magazine, a few articles in its "In Depth" section were provided with a link, such as "B2.0 Getting Hitched," for retrieval. The link, using RealName tool, led a reader to the on-line version of BUSINESS 2.0 at www.business2.com site, where the article was maintained. For the reader to save, print or email the article, another tool called "SAVE THIS" was used, which stored only the link at another site, called www.savethis.com.

However, www.savethis.com only stores link. Hence, whatever was stored by it was only valid at the mercy of the publisher's web site. In fact, accessing the article from www.savethis.com at a later time, using the article's link, was directed to the publisher's archival search tool, where the user was asked to conduct a search or to order from archive. Therefore, the user never had full control of the digital format of the printed article. All the user ever had was the link. Also, since only a limited number of articles came with the on-line version, it still presented an inefficient tool for the readers, since for the vast majority of articles in the magazine, the readers still needed to rely on the conventional clip, photocopy, fax or file routine. The limited usage of web linkage failed to address the needs of the readers, as well as fix the disconnect between printed media and the Internet.

Therefore, it is desirable to simplify and streamline the retrieval and handling of printed information.

It is desirable to be able to locate a desired printed article quickly.

It is also desirable to be able to store and retrieve the printed article efficiently.

It is desirable to be able to distribute the printed article efficiently.

It is desirable to enable others to store and retrieve the article just as efficiently.

With computers and the Internet as ubiquitous as they are today, the above needs and desires can finally be addressed as will be disclosed in the following.

SUMMARY OF THE DISCLOSURE

A method and system of using the Internet to retrieve printed articles is disclosed. The method of the present invention first tags each printed article that is to be published in print. The tag is also printed with the printed article to allow readers to identify. The printed article and its tag are collected and stored in a database, which is accessible through the Internet or the Worldwide Web. When a reader finds a printed article of interest to the reader on the print version of the media, the reader sends a request with the tag to the database. Upon receiving the request and the tag, the database is searched to locate the printed article. Upon locating the stored printed article in the database, it is transmitted to the reader's computer or to the reader's email address. Such article can now be stored, filed, distributed, shared in anyway the reader sees fit, all without having to labor through the traditional manual clipping tasks. Additionally, the delivery of each printed article is bundled with additional information relevant to the printed article based on pre-selected criteria.

Another embodiment of the present invention is an aggregator of publisher's printed articles, where each printed article from each publisher is tagged and stored. The aggregator pre-registers Internet clients to provide access rights. Upon receiving a request from an Internet client, the aggregator first authenticates the Internet client and then searches its database for the desired article. Upon locating the article, the article is transmitted to the Internet client at his PC or at his predetermined email address.

A further embodiment of the present invention is an aggregator that also has its database connected to a telecommunication gateway. When a reader finds an article of interest, the reader calls a pre-assigned number to make a request by entering the tag. Upon authenticating the caller, the request is processed and a search is conducted. Once located, the printed article is transmitted to the reader's pre-registered email address or fax number.

DETAILED DESCRIPTION OF THE INVENTION

The present invention is directed to a method and system of using a computer or an information device to retrieve the digital version of a printed article through the Internet. In the following detailed description, numerous specific details are set forth to provide a full understanding of the present invention. It will be obvious, however, to those ordinarily skilled in the art that the present invention may be practiced without some of these specific details. In other instances, well-known structures and techniques, such as web servers, hosting, database management, Internet file transfer protocols, and telephone data entry, have not been shown in detail so as to avoid unnecessarily obscure the present invention.

The present invention may be implemented by $3^{rd}$ party information aggregator, such as Yahoo, AOL, or MSN.com, to facilitate the transfer of digital format of printed information between several publishers and end-users through the Internet. The present invention may also be implemented by the sources, i.e. publishers, themselves, thus providing a way for their readers to efficiently access and handle printed information through the power of the Internet. The main emphasis is on efficiency and accuracy in the retrieval, as opposed to Further, while the requested printed information is transmitted to the reader who requests the information through the Internet, additional information, such as content-related advertisement, can be bundled to such transmission. This bundled additional information, whether related to the subject matter of the requested printed information or not, provides a more targeted reach to the readers than the advertisement populated in the printed magazine or newspaper.

Bundling advertisement with the transmission of information to the requested readers can help a means for generating revenue to offset the cost of implementing the retrieval service. For example, when a readers requests an article from the Wall Street Journal on, say, the future of $3^{rd}$ Generation Wireless, the advertisement that can be bundled may come from those intimately associated with the 3G technology, such as the equipment provider, content provider, or service provider.

Figure 1:
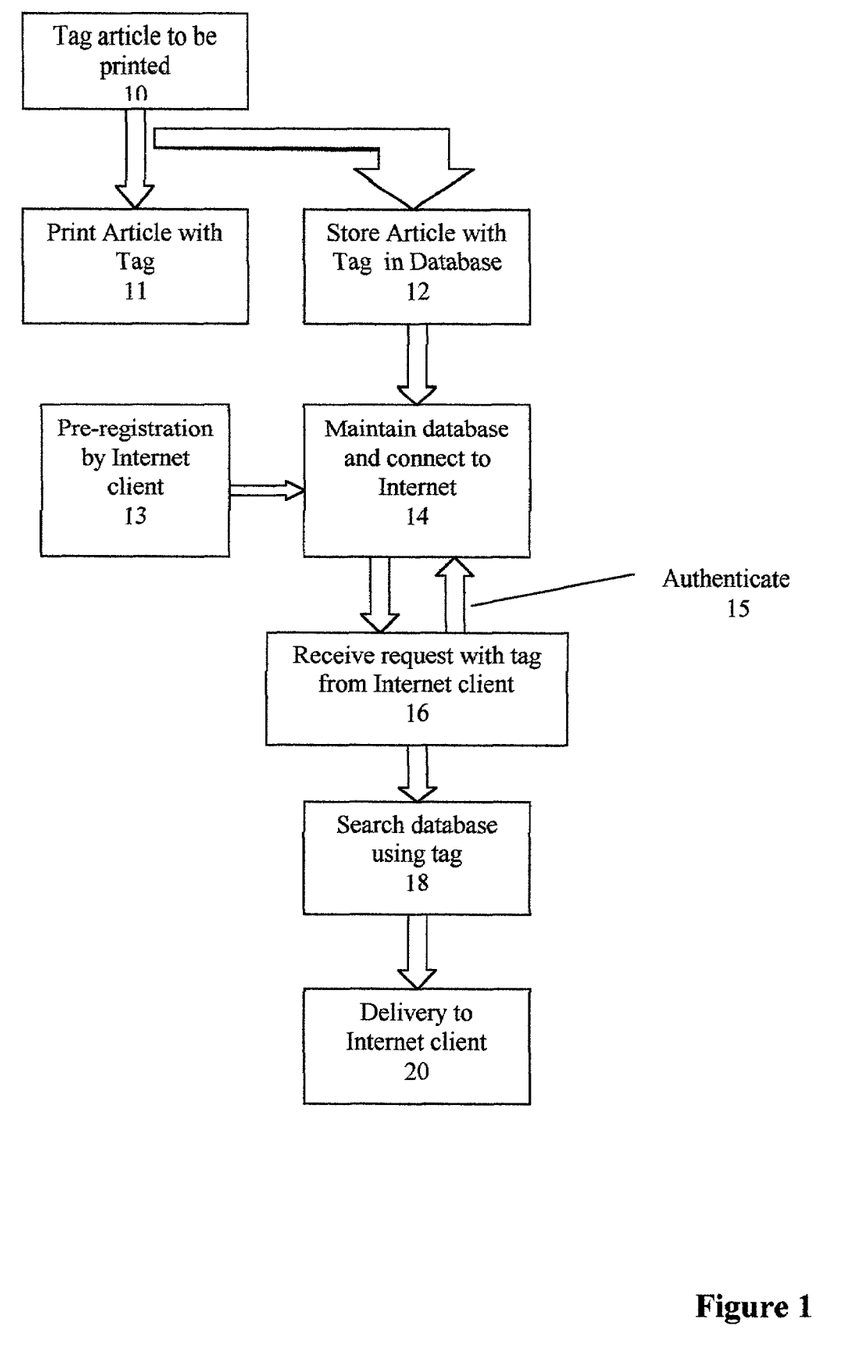
FIG. 1 illustrates a simplified flow diagram of an exemplary method of the present invention.

Reference is to FIG. 1, where a simplified flow chart of the methodology in accordance with the present invention is illustrated. The present invention is implemented by first identifying (block 10), or tagging, each piece of printed information ("article") with a unique code, a combination of codes, a combination of words or key words, or their equivalents (collectively called "tags"). Once the article is associated with its tags, the article is collected and stored (block 12) in a database, from which the article may be accurately retrieved based on any one of the tags. The article, when it is in print (block 11), will also include at least one of the tags ("default tag"), which may be a designated code such as, for example, "LAT-11272001-B1-4" to identify an article on Section B1, page 4, of the LA Times on Nov. 27, 2001. Those skilled in the art can easily determine the most convenient tags and default tags for use with newspaper and magazine readers. Also, such tagging and retrieving of information in general, on-line or not, is well-known to those skilled in the art of database management and Internet data transfer.

The database may be set up by the publishers themselves, or the database may be transferred to the care of a third party aggregator (block 14). When a reader finds an article of interest from the newspaper, instead of physically going through the conventional steps of clipping and photocopying mentioned above, the reader simply takes down the default tag of the article. Thereafter, the reader can go to the web site, where the database is maintained, to request such article using the default tag (block 16). The server, upon receiving the default tag, will search the database to locate the article based on the default tag for the reader (block 18). Delivery of the article (block 20) may be done real-time, or done by email to the reader's email address, if the reader is not at his personal computer.

It should be noted that the reader can gain access to the server in more than one way. For example, the reader can pre-register at the web site (block 13), and then enter through password authentication. Once the reader is authenticated (15), all of the requests will be filled based on pre-registered information. This first method is more conducive to a system of collecting a user fee, user information or user preference, upon pre-registration, since the information is collected once. Alternatively, the web site may be set up to allow any reader to make a request at the web site, much in the same way any user can access the search engines provided by yahoo.com or google.com. The requests will be filled based on the email address supplied by the reader at that time. For corporate or government users, the web site can also be set up to provide access based on one common password, provided that the reader's email address has the same domain name as the registered corporate or government entity, e.g. smith@uspto.gov.

In terms of tagging the article, the publisher can, of course, implement its own system of tagging, provided that each article within a specific newspaper or magazine can be identified through one or more tags, preferably always including a default tag which is printed along with the article. In other words, there should preferably be more than one tag for each article in the world's printed publication. Additionally, the tag may be made user-friendly by including the author's name or initial. As mentioned above, the tool RealName may be used to facilitate the naming and retrieval.

The following illustrates several ways to tag an article written by David Colker of the Los Angeles Times, on Nov. 27, 2001, on page A1, entitled The WEB NEVER FORGETS:

a. Default Tag: LAT11272001-A1-1;
b. LA Times, A1, Colker;
c. LAT, Colker, The Web;
d. LA Times, David Colker, Nov. 27, 2001;
e. Los Angeles Times, David Colker, The Web Never Forgets.

As can be appreciated by those skilled in the art of search engines, a search engine system such as www.google.com can easily search based on a combination of key words. Therefore, searching an article out of the database of articles, with pre-established tags, can be readily implemented with pin-point accuracy. It should be noted that one may create criteria for article's inclusion and not all articles need to be included. For example, it may be that in a magazine, all articles of a given section, interest, content, advertisement potential may be included. For those news briefs taking up very little space, one may decide not to include them, or may decide to bundle them as one from the same section.

Further to the search engine, this system in accordance with the present invention can be initiated with essentially a look-up table, where a tag, or tags, uniquely specifies an article in a printed publication. When the publication is prepared for circulation, the article is assigned its default tag, which is printed along with the article so that a reader can readily tell what the default tag is for the article she is reading. If the article takes up multiple pages of a newspaper or a magazine, the default tag can be printed out at the beginning or end of the article. As will be described below, the lengthier the printed article, the more efficiency can be realized by the system of the present invention.

Figure 2:
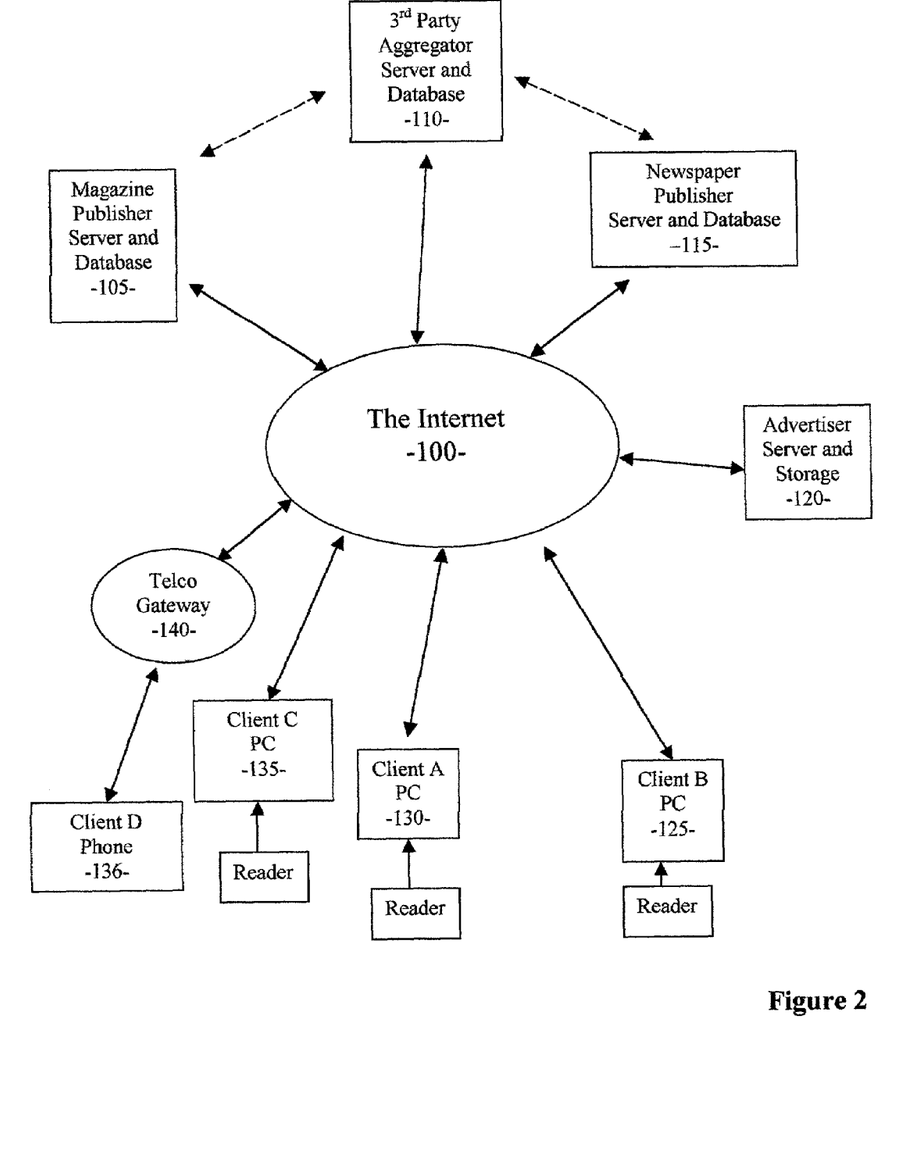
FIG. 2 illustrates a simplified diagram of an exemplary system of the present invention.

With each of the selected printed articles being identifiable by at least one tag and being stored in digital format, the present invention can now be physically implemented as illustrated in FIG. 2, which illustrates a simplified block diagram of one embodiment of the present invention.

Referring to FIG. 2, a global computer information network such as the Internet 100 connects to various clients, such as readers, and servers, such as publishers or aggregators. Connected to the Internet 100 is server and storage unit 105 operated by or for a magazine publisher. A newspaper publisher may have its server and storage unit 115 also connected to the Internet. A third-party aggregator, who operates to collect articles, is also connected to the Internet 100. Clients A 130, B 125, C 135 can be information processing device, operated by readers A, B, C respectively. A client D 136 can be a telephone or wireless phone accessing the Internet through a telecommunication gateway 140. It should be understood that an information processing device may be any device, such as PCs, data terminals, or PDAs, that provides access to the Internet for data entry and retrieval.

The method in which communication between the servers, storage units and clients and the Internet takes place is well known to those skilled in the art of Internet technology.

For example, TCP/IP is one of the most common Internet protocols. If client D 136 is a wireless phone, the communication can go through either the conventional gateway, or through Wireless Access Protocol ("WAP").

Retrieval Through the Web

Let us assume that the magazine publisher has a database stored in the storage unit 105, whereas the database contains the digital format of selected articles which have been printed for circulation. As previously described, each article, or file, so designated is identifiable by one or more tags. When a reader A of the printed magazine reads an interesting article, which has a code of BW101813, the reader can use his PC 130 to access the server and storage unit 105, through the Internet 100, to request a file matching the code BW101813. Upon receiving the request, the server and storage unit 105 respond to searching and sending the article matching the code BW101813 to the client A 130. The requesting, searching and replying are preferably done in a web-based environment for both the client and the server, as is well-known. Responding can be done by email or web download; articles can be either downloaded from the web site or be emailed to the requester's mailbox.

Now, the reader A has a digital copy of the article he is interested in. He can save and file it in his own PC with appropriate key words. He can email the article to his colleagues, next door or overseas, who similarly can save and file digitally. All this saving, filing, sharing, forwarding, distributing do not involve any of the aforementioned physical clipping, photocopying, faxing or scanning. The information, upon arrival, is ready to be handled in any way the recipient desires.

It should be noted that the server and storage unit 105 at the magazine publisher should preferably have some search tool to facilitate the searching based on the tags or the default tag. Such search tool, e.g. www.google.com, is quite well known to those skilled in the art of database management and the Internet. Also, it should be understood that the server and storage unit may be one operated by a third party 110, or one operated by a newspaper publisher 115, as long as the reader has a way of easily finding the web site for the server.

As mentioned above, the reader can gain access to the web site in a variety of ways, dependent on how accessing is initially set up between the web site and the user, the user's employer (e.g. uspto.gov) or the user's affiliation (e.g. IEEE.org). The access may even provided by the user's Internet Service Provider such as AOL or AT&T Worldnet.

Retrieval Through E-Mail

Instead of interacting with the server's web site, the reader may send an email of a given format, e.g. the default tag in the SUBJECT field, to a server where the files are located. When the email is properly interpreted by the receiving host, instructions will be issued to retrieve and send the requested article to the requester. Responding can be done by email or web download by the reader. A common tag entry may include: name of newspaper or magazine, name of author, date, and page.

Request to 3rd Party Aggregator

The publishers of newspapers and magazines may not wish to manage the servers and storage units for storing, searching and responding to readers' requests. Then a third party aggregator 110 can be used to collect all tagged articles from printed magazines and newspapers. Readers can issue their requests to a centralized aggregator for any articles. This way, readers do not have to go from one publisher's site to another, if the reader desires to retrieve articles from different sources. For example, Yahoo, due to its popularity, may become the aggregator site for Newsweek, Business Week, Wall Street Journal, Los Angeles Times, and many more. Readers will only have to go to "yahoo.com" to put in their requests and the articles will be e-mailed or downloaded for the requesters to keep.

Telephone Request

While reading a newspaper or magazine, a reader may not have instant access to his computer for requesting the articles. In this case, telephone may be used to dial to a publisher's number or an aggregator's number. After authentication, the reader enters the codes for the articles he desires. The request will be forwarded to the server for execution, e.g. email the article, or link, to the reader. This way, when the reader goes to his computer and check his email, his requested article or link will be there waiting for him. Authentication is needed when the reader has pre-registered his email address with the content provider. Upon authentication, the request will be filled by the content provider emailing the article to the reader's email address.

Even without pre-registration, the phone call to the server may be a toll call, where charge is billed along with the caller's phone bill. The caller can use the alphanumeric keys of the telephone to enter his or her email address, or fax number, for the server to respond. Although Fax-on-Demand is well known, such technology has not been extended to the needs of newspaper and magazine readers who want to retrieve articles for storage and sharing.

For wireless phones, the reader can either dial the content provider's number or the aggregator's number, whichever the reader has pre-registered with, to enter the requests. With the proliferation of WAP-based Internet access, the reader can go to the web site to input the request through WAP directly.

Advertisement Bundling

The content provider, whether it is the publisher itself or a third party aggregator, can respond to each request with pre-set advertising or with ads retrieved from an ad server and storage unit 120. Based on the subject matter of the requested article, the pre-entered profile of the requester, or both, advertisement matching the subject matter of the article may be bundled with the delivery. As mentioned before, if a reader requests an article from the Wall Street Journal, the related advertisement may be cell phone providers' advertisements, or promotions in the reader's neighborhood (based on any provided profile information from the reader during registration). This advertisement can then be bundled based on the subject matter of the article, the profile of the requester or both. Of course, the bundling can even be the latest news clips or stock quotes. In any event, the bundling can be real-time, or static.

Those skilled in the art of targeting consumers can readily determine ways to set matching criteria for bundling ads with the delivery of the requested article. Whether the ads are related to the requested article or not, having the ability to bundle the ads with a requested article seems to guarantee that the ads will be more targeted than the ads in their printed counterpart.

Advertisement bundling also creates a revenue model for the content providers or the publishers, who can either charge for the article-on-demand service or make it for free. If the reader gets the service for free, the reader may have to live with bundled advertisement. If the reader chooses to pay for the subscription, the reader will not get any bundled advertisement. If the reader is paying for the subscription, the content provider can generate revenue from the articles it has already made money in print. If the reader gets it for free, the content provider can generate revenue from advertisers or merchants.

The present invention can be implemented by a publisher or a third-party aggregator. For the publisher, the invention is a compatible tool for the publisher's database, which the publisher uses to store articles anyway. For a third party aggregator, the present invention is in the form of a tool for the aggregator to collect, store, search and retrieve articles from the publishers, through the Internet or other propietary channels.

Figure 3:
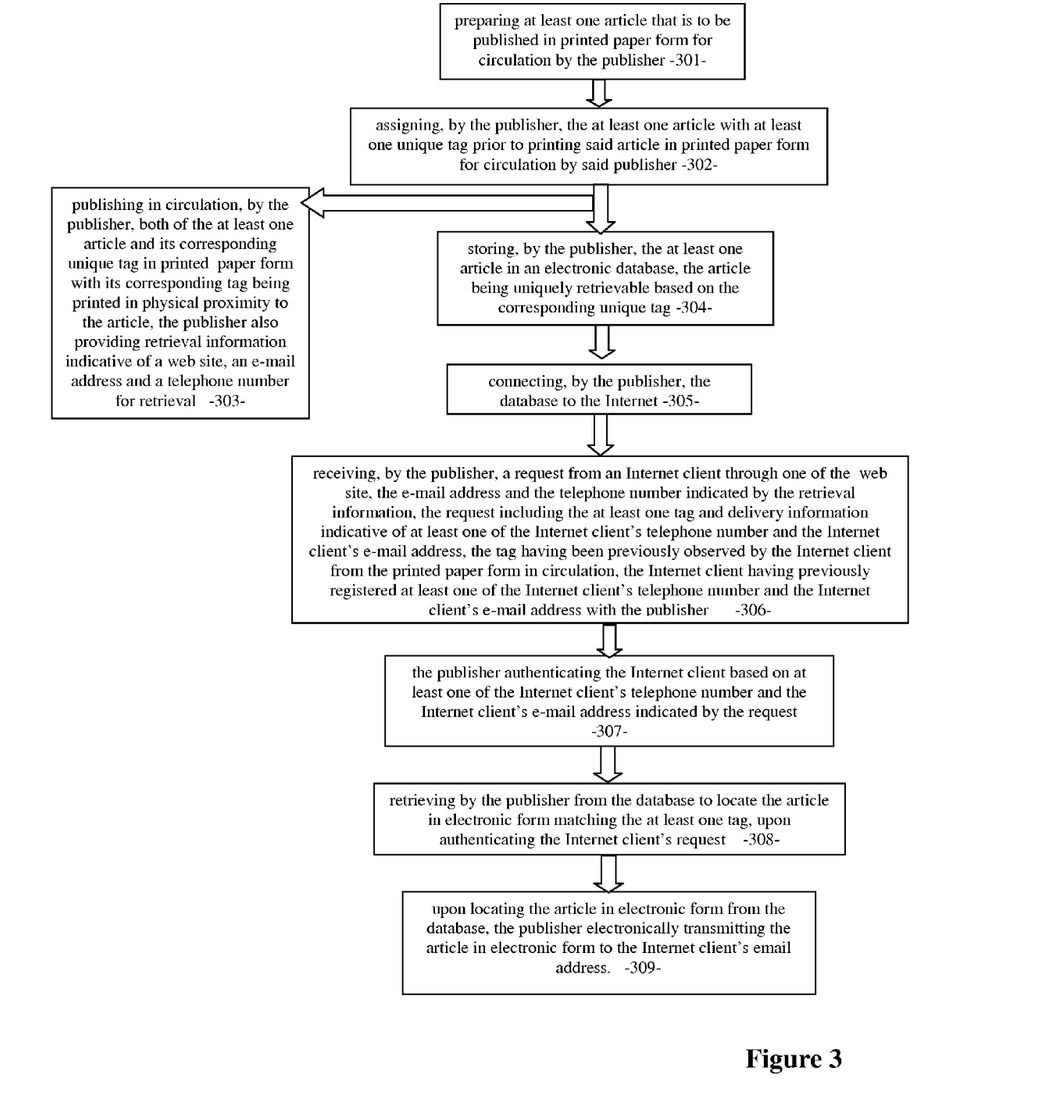
FIG. 3 illustrates a simplified flow diagram of second exemplary method of the present invention.
Figure 4:
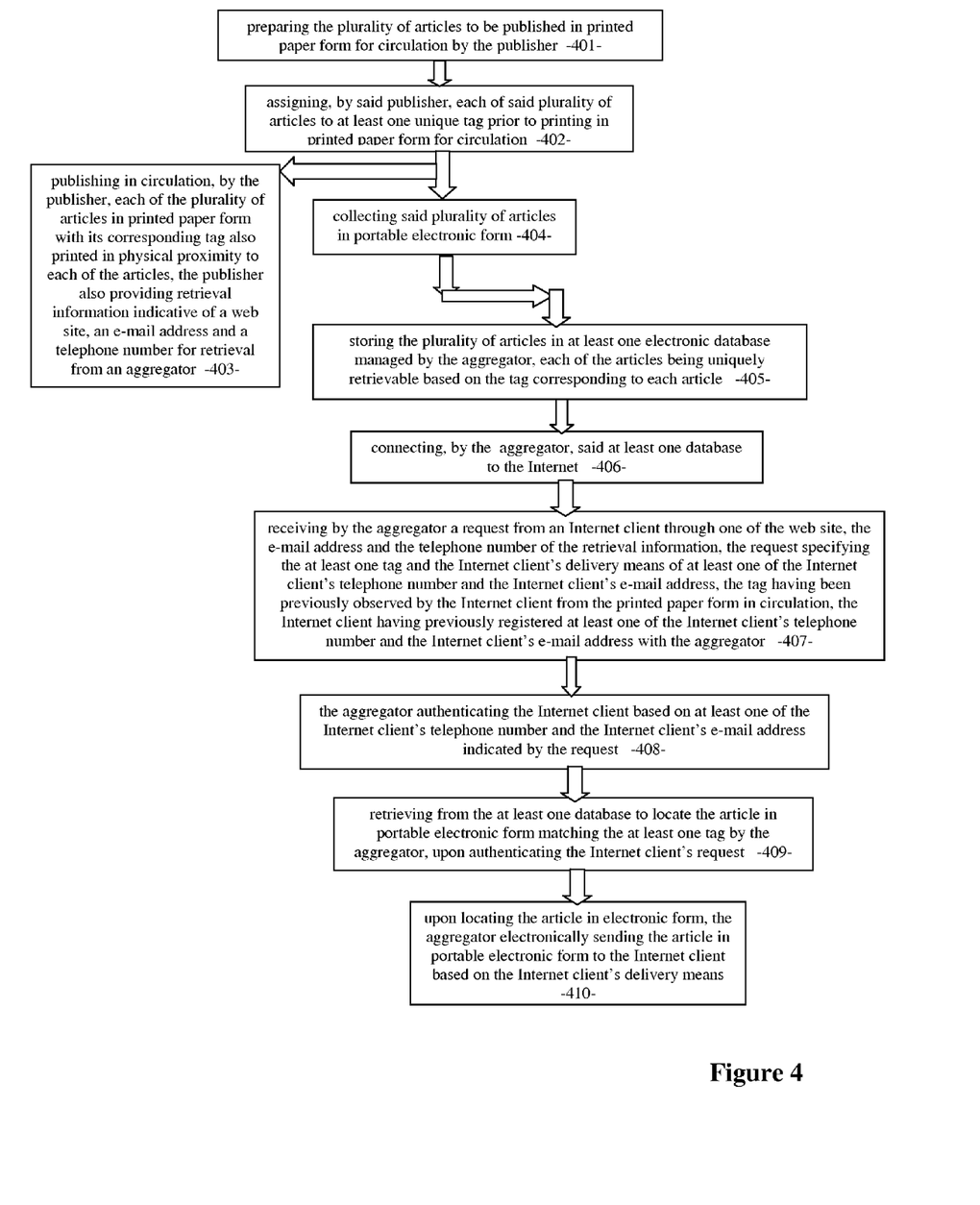
FIG. 4 illustrates a simplified flow diagram of third exemplary method of the present invention.

Reference is to FIG. 3, where a simplified flow diagram of a second exemplary embodiment of the present invention is illustrated. The method of using the Internet to retrieve an article in electronic form from a printed publication, comprises:

Block 301—Preparing at least one article that is to be published in printed paper form for circulation by the publisher;

Block 302—Assigning, by the publisher, the article with one unique tag prior to printing the article in printed paper form for circulation by the publisher;

Block 303—Publishing in circulation, by the publisher, both of the one article and its corresponding unique tag in printed paper form with its corresponding tag being printed in physical proximity to the article, the publisher also providing retrieval information indicative of a web site, an e-mail address and a telephone number for retrieval;

Block 304—Storing, by the publisher, the article in an electronic database, the article being uniquely retrievable based on the corresponding unique tag;

Block 305—Connecting, by the publisher, the database to the Internet, where the database is a telecommunication gateway adapted to transmit the request through wireless and landline telephone network;

Block 306—Receiving, by the publisher, a request from an Internet client through one of the web site, the e-mail address and the telephone number indicated by said retrieval information, the request including the at least one tag and delivery information indicative of at least one of the client's telephone number and e-mail address, the tag having been previously observed by the client from the printed paper form in circulation, the client having previously registered at least one of the client's telephone number and the client's e-mail address with the publisher;

Block 307—The publisher authenticating the client based on at least one of the client's telephone number and the client's e-mail address indicated by the request;

Block 308—Retrieving by the publisher from the database to locate the article in electronic form matching the tag, upon authenticating the client's request;

Block 309—Upon locating the article in electronic form from the database, the publisher electronically transmitting the article in electronic form to the client's email address, and Reference is to FIG. 4, where a simplified flow diagram of another exemplary embodiment of the present invention is illustrated. The method, which provides retrieval through an aggregator, comprises:

Block 401—Preparing a plurality of articles to be published in printed paper form for circulation by a publisher;

Block 402—Assigning, by the publisher, each of the articles to at least one unique tag prior to printing in printed paper form for circulation;

Block 403—Publishing in circulation, by the publisher, each of the articles in printed paper form with its corresponding tag also printed in physical proximity to each of the articles, the publisher also providing retrieval information indicative of a web site, an e-mail address and a telephone number for retrieval from an aggregator;

Block 404—Collecting the articles in portable electronic form;

Block 405—Storing the articles in electronic database managed by the aggregator, each of the articles being uniquely retrievable based on the tag corresponding to each article;

Block 406—Connecting, by the aggregator, the database to the Internet;

Block 407—Receiving by the aggregator a request from an Internet client through any one of the web site, the e-mail address and the telephone number indicated by the retrieval information, the request specifying a tag and the Internet client's delivery means of either one of the Internet client's telephone number or e-mail address, the tag having been previously observed by the Internet client from the printed paper form in circulation, the client having previously registered at least one of the Internet client's telephone number and the e-mail address with the aggregator;

Block 408—The aggregator authenticating the Internet client based on either one of the Internet client's telephone number and the Internet client's e-mail address indicated by the request;

Block 409—Retrieving from database to locate the article in portable electronic form matching the at least one tag by the aggregator, upon authenticating the Internet client's request, and Block 410—Upon locating the article in electronic form, the aggregator electronically sending the article in portable electronic form to the Internet client based on the Internet client's delivery means.

The potential beneficiaries of the present invention are numerous. Individual consumers who want to save time in clipping articles for filing or for sharing. Corporations or governmental agencies who want to keep their employees from wasting time to clip, photocopy, fax, and physically file printed information. Schools or libraries will have instant access to any printed articles on demand. The savings in time, photocopying and faxing will be immeasurable. Just ask anyone who has tried to clip an article from the Wall Street Journal for filing and faxing.

While specified features of the invention may be shown in some drawings and not others, this is for convenience and clarity of description only, it being understood that each feature may be combined with any or all of the other features of the invention. Similarly the particular selection of tagging, filing, delivering of information, etc., are illustrative of what is believed to be preferred; but further modifications will occur to those skilled in this art, and such are considered to fall within the spirit and scope of the invention as defined in the appended claims.

I claim:

1. A method of using the Internet to retrieve and handle at least one article in electronic form from a printed publication which has been printed in paper form by a publisher, comprising:

preparing at least one article that is to be published in printed paper form for circulation by said publisher;

assigning, by said publisher, said at least one article with at least one unique tag prior to printing said article in printed paper form for circulation by said publisher;

publishing in circulation, by said publisher, both of said at least one article and its corresponding unique tag in printed paper form with its corresponding tag being printed in physical proximity to said article, said publisher also providing retrieval information indicative of a web site, an e-mail address and a telephone number for retrieval;

storing, by said publisher, said at least one article in an electronic database, said article being uniquely retrievable based on said corresponding unique tag;

connecting, by said publisher, said database to said Internet;

receiving, by said publisher, a request from an Internet client through one of said web site, said e-mail address and said telephone number indicated by said retrieval information, said request including said at least one tag and delivery information indicative of at least one of said Internet client's telephone number and said Internet client's e-mail address, said tag having been previously observed by said Internet client from said printed paper form in circulation, said Internet client having previously registered at least one of said Internet client's telephone number and said Internet client's e-mail address with said publisher;

said publisher authenticating said Internet client based on at least one of said Internet client's telephone number and said Internet client's e-mail address indicated by said request;

retrieving by said publisher from said database to locate said article in electronic form matching said at least one tag, upon authenticating said Internet client's request;

upon locating said article in electronic form from said database, said publisher electronically transmitting said article in electronic form to said Internet client's email address, said method further comprising:

upon pre-registering said Internet client, collecting and storing said Internet client's email address for delivery;

connecting said database to a telecommunication gateway, said gateway being adapted to transmit said request from an Internet client to said database through one of wireless and landline telephone telecommunication network;

upon authenticating said Internet client, sending said printed article in electronic form to said Internet client's email address previously collected.

2. The method of claim 1, further comprising the step of bundling additional information relevant to a subject matter of said article when electronically transmitting said article in portable electronic form to said Internet client, said relevant additional information being one of pre-supplied by another server as static information and supplied by another server in real-time.

3. The method of claim 2, further comprising the step of bundling additional relevant information based on profile information supplied by said Internet client during pre-registrating, said additional information being one of pre-supplied by another server as static information and supplied by another server in real-time.

4. The method of claim 3, further comprising the steps of bundling based on the profile information supplied by said Internet client and subject matter of said printed article, and collecting a fee by said publisher from said server for such bundling.

5. The method of claim 2, wherein the step of electronically transmitting said article in portable electronic form comprises sending to said email address supplied by said Internet client, wherein said request by said Internet client is in an e-mail with said at least one tag indicated in a subject field of the e-mail.

6. The method of claim 4, wherein the step of assigning at least one tag to said article comprises:

assigning a default code, said default code being published with said article when printed in physical form for circulation;

assigning additional codes, comprising:

name of publication;

author's name;

date of publication;

at least a portion of said printed article's title.

7. A method of using the Internet to retrieve and handle a plurality of articles in electronic form from a plurality of publications which have been printed in paper form for circulation by at least one publisher, comprising:

a first step of printing an article in paper format for circulation by said publisher, comprising:

preparing said plurality of articles to be published in printed paper form for circulation by said publisher;

assigning, by said publisher, each of said plurality of articles to at least one unique tag prior to printing in printed paper form for circulation;

publishing in circulation, by said publisher, each of said plurality of articles in printed paper form with its corresponding tag also printed in physical proximity to each of said articles, said publisher also providing retrieval information indicative of a web site, an e-mail address and a telephone number for retrieval from an aggregator;

collecting said plurality of articles in portable electronic form;

storing said plurality of articles in at least one electronic database managed by said aggregator, each of said articles being uniquely retrievable based on said tag corresponding to each article;

connecting, by said aggregator, said at least one database to said Internet; and a second step of retrieving said article in portable electronic format, comprising:

receiving by said aggregator a request from an Internet client through one of said web site, said e-mail address and said telephone number indicated by said retrieval information, said request specifying said at least one tag and Internet client's delivery means of at least one of said Internet client's telephone number and said Internet client's e-mail address, said tag having been previously observed by said Internet client from said printed paper form in circulation, said Internet client having previously registered at least one of said Internet client's telephone number and said Internet client's e-mail address with said aggregator;

said aggregator authenticating said Internet client based on at least one of said Internet client's telephone number and said Internet client's e-mail address indicated by said request;

retrieving from said at least one database to locate said article in portable electronic form matching said at least one tag by said aggregator, upon authenticating said Internet client's request;

upon locating said article in electronic form, said aggregator electronically sending said article in portable electronic form to said Internet client based on said Internet client's delivery means, said method further comprising:

connecting said at least one database to a telecommunication gateway, said gateway being adapted to transmit a request with a tag from a telecommunication client to said database, said database being assigned said telephone number previously published by said publisher, said telecommunication client being assigned said Internet client's telephone number;

upon authenticating said request from said telecommunication client by recognizing said Internet client's telephone number, processing said request;

upon retrieving an article in portable electronic form matching said tag, transmitting said article in portable electronic form to said telecommunication client based on said Internet client's delivery means.

8. The method of claim 7, further comprising the step of bundling additional information relevant to a subject matter of said article with the electronic delivery of said article in portable electronic form to said Internet client, said relevant additional information being one of pre-supplied by another server as static information and supplied by another server in real-time.

* * * * *